United States Patent
He et al.

(10) Patent No.: US 12,488,442 B2
(45) Date of Patent: *Dec. 2, 2025

(54) ANISOPLANATIC ABERRATION CORRECTION METHOD AND APPARATUS FOR ADAPTIVE OPTICAL LINEAR BEAM SCANNING IMAGING

(71) Applicant: Suzhou Institute of Biomedical Engineering and Technology, Chinese Academy of Sciences, Suzhou (CN)

(72) Inventors: Yi He, Suzhou (CN); Yiwei Chen, Suzhou (CN); Lina Xing, Suzhou (CN); Wen Kong, Suzhou (CN); Guohua Shi, Suzhou (CN)

(73) Assignee: Suzhou Institute of Biomedical Engineering and Technology, Chinese Academy of Sciences, Suzhou (CN)

( * ) Notice: Subject to any disclaimer, the term of this patent is extended or adjusted under 35 U.S.C. 154(b) by 417 days.

This patent is subject to a terminal disclaimer.

(21) Appl. No.: 17/904,173

(22) PCT Filed: Jun. 15, 2021

(86) PCT No.: PCT/CN2021/100042
§ 371 (c)(1),
(2) Date: Aug. 12, 2022

(87) PCT Pub. No.: WO2021/254309
PCT Pub. Date: Dec. 23, 2021

(65) Prior Publication Data
US 2023/0100817 A1    Mar. 30, 2023

(30) Foreign Application Priority Data
Jun. 16, 2020 (CN) .......................... 202010550799.7

(51) Int. Cl.
*G06T 5/80* (2024.01)
*A61B 3/12* (2006.01)
(Continued)

(52) U.S. Cl.
CPC .................. *G06T 5/80* (2024.01); *A61B 3/12* (2013.01); *G02B 26/105* (2013.01); *G02B 27/0031* (2013.01)

(58) Field of Classification Search
CPC ... G06T 5/80; G06T 2207/10056; G06T 5/73; G06T 3/4038; G06T 7/11; A61B 3/12;
(Continued)

(56) References Cited

U.S. PATENT DOCUMENTS

2015/0177160 A1* 6/2015 Zoeller, III ........ G01N 21/8806
356/521
2021/0121063 A1  4/2021 Shi et al.

FOREIGN PATENT DOCUMENTS

CN    105300941 A * 2/2016
CN    107361739 A   11/2017
(Continued)

OTHER PUBLICATIONS

International Search Report for Corresponding International Application No. PCT/CN2021/100042, 5 pages.
(Continued)

*Primary Examiner* — Bumsuk Won
*Assistant Examiner* — Ray Alexander Dean
(74) *Attorney, Agent, or Firm* — DINSMORE & SHOHL LLP (57) ABSTRACT

An anisoplanatic aberration correction method and apparatus for adaptive optical linear beam scanning imaging. The method comprises: in an adaptive optical linear beam scanning imaging system, performing temporal correction on an anisoplanatic region aberration in a linear beam scanning
(Continued)

direction, and performing regional correction on an anisoplanatic region aberration in a linear beam direction. According to the method, the limitation of an isoplanatic region on an adaptive optical imaging field of view can be overcome, and wide field of view aberration correction and high-resolution imaging of a retina is realized. According to the provided method and apparatus for temporal and regional correction of a wide field of view anisoplanatic aberration, the wide field of view aberration correction can be completed by means of only a single wavefront sensor and a single wavefront corrector, such that almost none of the system complexities is increased.

9 Claims, 3 Drawing Sheets (51) Int. Cl.
G02B 26/10 (2006.01)
G02B 27/00 (2006.01)

(58) Field of Classification Search
CPC .. A61B 3/0025; A61B 3/1015; G02B 26/105; G02B 27/0031; G02B 21/0012; G02B 21/0072; G02B 26/10
See application file for complete search history.

(56) References Cited

FOREIGN PATENT DOCUMENTS

| | | |
|---|---|---|
| CN | 110584592 A | 12/2019 |
| CN | 110584593 A | 12/2019 |
| CN | 110794577 A | 2/2020 |
| EP | 3811851 A1 | 4/2021 |

OTHER PUBLICATIONS

Written Opinion for Corresponding International Application No. PCT/CN2021/100042, 5 pages.
Chuhan, Wu, et al., Fundus Imaging System Based on Tomographic Adaptive Optics, China Academic Journal Electronic Publishing House, vol. 37, No. 4, Apr. 2017, 8 pages.
First Office Action Issued in Corresponding Chinese Application No. 202010550799. 7, 6 pages.
International Search Report PCT/CN2021/100042, Mailed Sep. 13, 2021.

* cited by examiner

ANISOPLANATIC ABERRATION CORRECTION METHOD AND APPARATUS FOR ADAPTIVE OPTICAL LINEAR BEAM SCANNING IMAGING

CROSS REFERENCE TO RELATED APPLICATIONS

This application is a 371 of International Patent Application Number PCT/CN2021/100042, filed on Jun. 15, 2021, which claims the benefit and priority of the Chinese patent application No. 202010550799.7, filed to the Patent Office of the People's Republic of China on Jun. 16, 2020, the entire contents of which are incorporated herein by reference.

TECHNICAL FIELD

The present application relates to the field of adaptive optics high-resolution imaging, and in particular relates to an anisoplanatic aberration correction method and apparatus for adaptive optical linear beam scanning imaging.

BACKGROUND

In order to observe the fundus retina more clearly, adaptive optics technology is introduced into the field of retinal optical imaging. Using adaptive optics to measure and correct the aberration of the eye optical system can realize high-resolution imaging of the fundus retina, which can clearly distinguish the micro meter level capillaries, visual cells and other tissues.

However, the aberration measurement and correction of adaptive optics technology can only be effective within an angular range near the center of the field of view, this angular range is defined as the "isoplanatic region" to which the adaptive optics correction range is limited, and the aberration in the isoplanatic region can be completely corrected by adaptive optics, while the anisoplanatic aberration beyond the isoplanatic region can only be partially corrected by adaptive optics. When adaptive optics is applied to fundus retina imaging, the isoplanatic region of the eye is usually considered to have an angle of field of view of no more than 2°. At present, almost all adaptive optics retina high-resolution imaging systems have an imaging field of view that is less than 2°, which corresponds to only a very small area on the retina. In fact, all kinds of micro tissues closely related to visual function are distributed in an angle range of about 100° on the retina. In order to complete high-resolution imaging of a larger range of the retina or the whole retina, at present, it is widely used to obtain an image in a large field of view by multiple times of imaging and then image stitching. However, depending on the visual fixation ability of the subjects, the accuracy, the success rate and the efficiency of the image stitching are very low.

Multi-Conjugate Adaptive Optics (MCAO) technology has been applied to the field of astronomical observation, and was successfully used in a retinal floodlighting imaging system for the first time in 2009 in order to solve the problem of the imaging field of view being small and limited by the isoplanatic region of the eye, wherein multiple wavefront sensors and multiple wavefront correctors were used to realize aberration reginal measurement and simultaneous reginal correction in a field of view of 7°. However, the MCAO technology has huge system structure, high technical cost, interconnecting of aberrations in adjacent isoplanatic regions, high complexity of closed-loop control of multiple sets of aberration correction, and slow imaging speed. More crucially, the MCAO technology is only suitable for non-scanning flood lighting imaging systems, and there is no report on its application in scanning imaging systems at present.

SUMMARY OF THE APPLICATION

Based on the above background, the present application provides a temporal and regional correction method and apparatus for correcting an anisoplanatic aberration in a wide field of view for a linear beam scanning imaging system. Without adding adaptive optical wavefront sensor and wavefront corrector, the anisoplanatic aberration in the linear beam scanning direction is measured by temporal aberration measurement and corrected by temporal closed-loop correction, and the anisoplanatic aberration in the linear beam direction is corrected by regional image processing with supplementary correction, so as to realize the complete correction of anisoplanatic aberration in a wide field of view. The temporal and regional correction method and apparatus for correcting a wide field of view anisoplanatic aberration provided by the present application only need a single wavefront sensor and a single wavefront corrector to complete the wide field of view aberration correction, which hardly increases any system complexity, and is highly practical and innovative.

The technical solution adopted in the present application is to provide an anisoplanatic aberration correction method for adaptive optical linear beam scanning imaging, which comprises: in an adaptive optical linear beam scanning imaging system, performing temporal correction on an anisoplanatic region aberration in a linear beam scanning direction, and performing regional correction on an anisoplanatic region aberration in a linear beam direction.

Preferably, the process of performing temporal correction on an anisoplanatic region aberration in a linear beam scanning direction comprises the following steps:

step S1: according to scanning time, dividing an anisoplanatic imaging region into multiple imaging sub-regions in the scanning direction, the imaging sub-regions comprise imaging sub-region 1, imaging sub-region 2, ..., and imaging sub-region N, a field of view of each imaging sub-region in the scanning direction is no more than 2°;

step S2: measuring the aberration of each imaging sub-region by a wavefront sensor successively, and feeding back to control a wavefront corrector successively to complete a closed-loop correction of the aberration of each imaging sub-region successively;

wherein, in each imaging sub-region, a central area within ±1° in the linear beam direction meets an isoplanatic region principle both in the scanning direction and in the linear beam direction, and the aberration in the central area is completely corrected.

Preferably, the multiple imaging sub-regions can be uniformly divided or non-uniformly divided; N is a positive integer.

Preferably, the field of view of each imaging sub-region in the scanning direction is 2°.

Preferably, the process of performing regional correction on an anisoplanatic region aberration in a linear beam direction comprises the following steps:

step T1: dividing the part of each imaging sub-region on both sides of the central area in the linear beam direction into two image correction areas: a first image correction area and a second image correction area;

the first image correction area has an area range of −1° to −M° in the linear beam direction, and the second image correction area has an area range of 1° to M° in the linear beam direction;

step T2: converting a wavefront aberration of each imaging sub-region measured by the wavefront sensor to obtain a point spread function (PSF) of each imaging sub-region, taking the PSF of each imaging sub-region as an initial PSF value and a constraint condition of the two image correction areas corresponding to each imaging sub-region, and then performing deconvolution correction of the anisoplanatic region aberration of the two image correction areas respectively by Wiener filtering;

step T3: after the deconvolution correction of the anisoplanatic region aberration of all image correction areas is completed, performing image stitching to obtain an imaging image with the anisoplanatic aberration of the whole field of view completely corrected.

Preferably, M is a positive integer, and M does not exceed 3.

Preferably, the step T2 is specifically as follows:

T2-1: with the wavefront aberration of each imaging sub-region measured by the wavefront sensor being $W_{i,j}(\xi, \eta)$, $1 \le i \le M$, $1 \le j \le N$, calculating the point spread function (PSF) of each imaging sub-region to be $h_{i,j}(x, y)$, $1 \le i \le M$, $1 \le j \le N$, wherein, $$h_{i,j}(x, y) = \left\| \int\int P_{i,j}(\xi, \eta) \exp(jkW_{i,j}(\xi, \eta)) \exp\left(-j\frac{k}{f}[(x\xi + y\eta)]\right) d\xi d\eta \right\|_2^2;$$

where $P_{i,j}(\xi, \eta)$ is a pupil function of a sub-lens of the wavefront sensor, f is a focal length of the sub-lens, and k is a wavenumber constant;

T2-2: taking the PSF of each imaging sub-region as an initial PSF value and a constraint condition of the imaging image of each imaging sub-region, and then performing deconvolution processing of the imaging image of each imaging sub-region respectively by the following incremental Wiener filtering iterative formulas to realize a supplementary correction of a residual aberration of the imaging image of each imaging sub-region, $$X_{i,j}^{new}(u, v) = X_{i,j}^{old}(u, v) + \frac{H_{i,j}^*(u, v)S(u, v)}{|H_{i,j}(u, v)|^2 + \gamma_x};$$

$$H_{i,j}^{new}(u, v) = H_{i,j}^{old}(u, v) + \frac{X_{i,j}^*(u, v)S(u, v)}{|X_{i,j}(u, v)|^2 + \gamma_h};$$

$$S(u, v) = Y(u, , v) - X_{i,j}(u, v)H_{i,j}(u, v);$$

wherein, * represents the complex conjugate operator, i and j represent the sequence number of each sub-region, $Y_{i,j}(u, v)$ is the Fourier transform of the imaging image of the imaging sub-region, $X_{i,j}^{new}(u, v)$ and $X_{i,j}^{old}(u, v)$ respectively represent the Fourier transforms of the current and last deconvolution processing iterations of the imaging image of the imaging sub-region, $H_{i,j}^{new}(u, v)$ and $H_{i,j}^{new}(u, v)$ respectively represent the Fourier transforms of the current and last deconvolution processing iterations of the PSF estimation of the imaging sub-region, S(u, v) is the precision term, and with the update of the $X_{i,j}^{new}(u, v)$ and $H_{i,j}^{new}$ (u, v) values, the value of S(u, v) is updated in time; $\gamma_x$ and $\gamma_h$ are parameters that control the iteration step size, and larger values of $\gamma_x$ and $\gamma_h$ correspond to a smaller iteration step size and a slower convergence speed of algorithm and a more accurate solution, and if the values of $\gamma_x$ and $\gamma_h$ decrease, the iteration step size increases and the algorithm will converge to an unsmooth solution faster, wherein, the values of $\gamma_x$ and $\gamma_h$ are $r_h=0.2|H(0, 0)|^2$, $r_x=0.2|X(0, 0)|^2$.

Preferably, the step T2 is performed by online processing or offline processing.

The present application also provides an anisoplanatic aberration correction apparatus for adaptive optical linear beam scanning imaging, which comprises an adaptive optical linear beam scanning imaging device, a wavefront sensor, a wavefront controller, a wavefront corrector and a computer;

the wavefront controller is configured to extract a wavefront aberration measured by the wavefront sensor and feeds it back to control the wavefront corrector, the computer is configured to control the wavefront controller according to the method described above to complete a closed-loop temporal correction on an anisoplanatic region aberration and realize online or offline regional correction on an anisoplanatic region aberration.

Preferably, the adaptive optical linear beam scanning imaging device comprises an imaging light source, a collecting system, a first beam splitter, a dichroic beam splitter, a second beam splitter, a first beam shrinking and expanding system, a second beam shrinking and expanding system, a third beam shrinking and expanding system, a scanning mirror and a beacon light source;

a linear beam emitted by the imaging light source is reflected by the first beam splitter, transmitted through the dichroic beam splitter, and propagated by the first beam shrinking and expanding system to reach the wavefront corrector, the wavefront corrector reflects the linear beam to the second beam shrinking and expanding system which then propagates the linear beam to the scanning mirror, the scanning mirror reflects the linear beam to the third beam shrinking and expanding system which then propagates the linear beam into an eye to illuminate a fundus retina, and after being reflected by the fundus retina, the reflected linear beam exits the eye and returns to the first beam splitter along the original path thereof, and enters the collecting system after being transmitted through the first beam splitter, the collecting system is configured to photoelectrically convert the linear beam, the computer is configured to control the scanning mirror to realize linear beam scanning, and synchronously control the collecting system to obtain a retinal imaging image;

a parallel beam emitted by the beacon light source is reflected by the second beam splitter, and after being reflected by the dichroic beam splitter, the parallel beam is propagated by the first beam shrinking and expanding system to reach the wavefront corrector, the wavefront corrector reflects the parallel beam to the second beam shrinking and expanding system which then propagates the parallel beam to the scanning mirror, the scanning mirror reflects the parallel beam to the third beam shrinking and expanding system which then propagates the parallel beam into the eye to illuminate the fundus retina, and after being reflected by the fundus retina, the reflected parallel beam exits the eye and returns to the second beam splitter along the original path thereof, and enters the wavefront sensor after being transmitted through the second beam splitter, and the wavefront sensor is configured to measure the wavefront aberration.

The beneficial effects of the present application are:

(1) The limitation of an isoplanatic region on an adaptive optical imaging field of view can be overcome, and aberration correction and high-resolution imaging of a retina in a wide field of view is realized.

(2) According to the provided method and apparatus for temporal and regional correction of an anisoplanatic aberration in a wide field of view, the aberration correction in a wide field of view can be completed by means of only a single wavefront sensor and a single wavefront corrector, such that almost no system complexity is added, which is highly practical.

(3) The provided correction method of an image subjected to deconvolution is low in cost. By means of regional deconvolution of wavefront aberration information, the adaptive optical aberration correction can be compensated to the greatest possible extent, the correction effect is good, and online processing or post-processing can be performed, and correction is flexible and convenient.

DETAILED DESCRIPTION OF EMBODIMENTS

The present application will be further described in detail below in combination with the embodiments, so that those skilled in the art can refer to the text of the description to implement accordingly.

It should be understood that terms such as "have", "include" and "comprise" used herein do not exclude the existence or addition of one or more other elements or combinations thereof.

In an adaptive optical linear beam scanning imaging system, the wavefront aberration in a linear beam scanning direction can be temporally measured by the wavefront sensor. Due to the anisoplanatic effect, the wavefront aberration in the linear beam direction can not be measured directly by the wavefront sensor, and only the wavefront aberration in an available full field of view in the linear beam direction can be measured. Therefore, it is necessary to provide different correction methods for correcting the anisoplanatic region aberration in these two directions. The present application provides a temporal and regional correction method and apparatus for correcting an anisoplanatic aberration in a wide field of view for adaptive optical linear beam scanning imaging.

Embodiment 1

Figure 1:
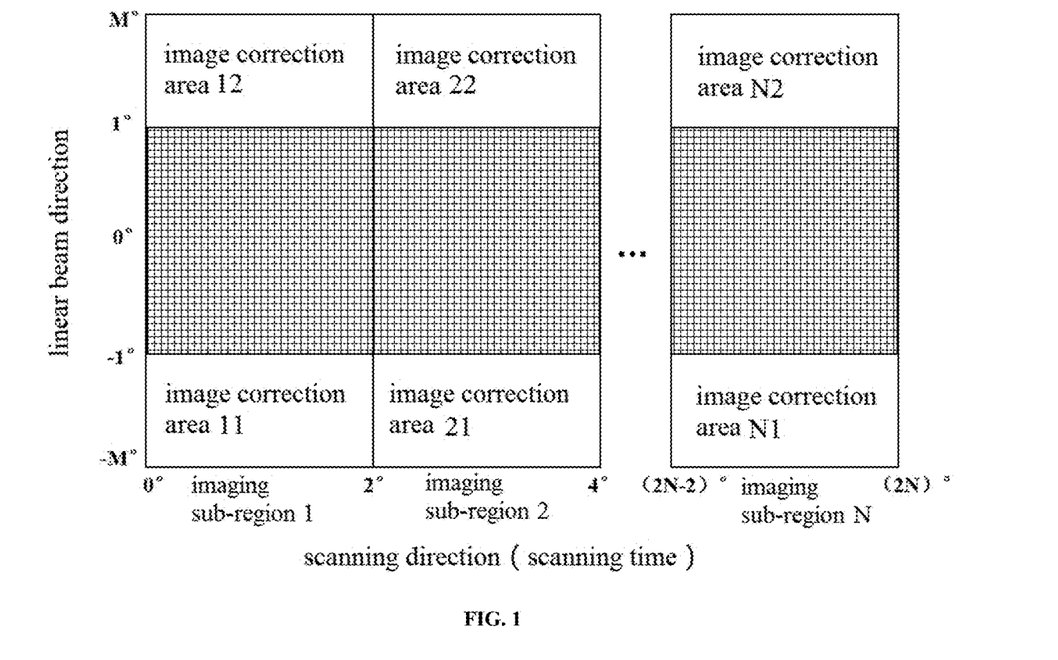
FIG. 1 is a schematic diagram of the principle of an anisoplanatic aberration correction method for adaptive optical linear beam scanning imaging in Embodiment 1 of the present application.

As shown in FIG. 1, an anisoplanatic aberration correction method for adaptive optical linear beam scanning imaging comprises: in an adaptive optical linear beam scanning imaging system, performing temporal correction on an anisoplanatic region aberration in a linear beam scanning direction, and performing regional correction on an anisoplanatic region aberration in a linear beam direction, specifically as follows:

I. Performing Temporal Correction on an Anisoplanatic Region Aberration in a Linear Beam Scanning Direction:

Step S1: according to scanning time, dividing an anisoplanatic imaging region into multiple imaging sub-regions in the scanning direction, the imaging sub-regions comprise imaging sub-region 1, imaging sub-region 2, . . . , and imaging sub-region N, a field of view of each imaging sub-region in the scanning direction is no more than 2°; the multiple imaging sub-regions can be uniformly divided or non-uniformly divided; N is a positive integer, and each imaging sub-region meets an isoplanatic region principle. In the present embodiment, the field of view of each imaging sub-region in the scanning direction is 2°, and the field of view of the entire anisoplanatic imaging region in the scanning direction is (2N)°.

Step S2: measuring the aberration of each imaging sub-region by a wavefront sensor successively, and feeding back to control a wavefront corrector successively to complete a closed-loop correction of the aberration of each imaging sub-region successively.

By means of the above steps, in each imaging sub-region, a central area within ±1° in the linear beam direction meets an isoplanatic region principle, and the aberration in the central area is completely corrected, that is, the 2° (linear beam direction)×(2N)° (scanning direction) anisoplanatic aberration has been completely corrected.

II. Performing Regional Correction on an Anisoplanatic Region Aberration in a Linear Beam Direction:

Step T1: dividing the part of each imaging sub-region on both sides of the central area in the linear beam direction into two image correction areas: a first image correction area and a second image correction area; as shown in the figures, two image correction areas N1 and N2 are corresponding to both sides of the imaging sub-region N;

the first image correction area has an area range of −1° to −M° in the linear beam direction, and the second image correction area has an area range of 1° to M° in the linear beam direction; wherein, M is a positive integer, and M does not exceed 3.

Step T2: converting a wavefront aberration of each imaging sub-region measured by the wavefront sensor to obtain a point spread function (PSF) of each imaging sub-region, taking the PSF of each imaging sub-region as an initial PSF value and a constraint condition of the two image correction areas corresponding to each imaging sub-region, and then performing deconvolution correction of the anisoplanatic region aberration of the two image correction areas respectively by Wiener filtering; this step specifically comprises:

T2-1: with the wavefront aberration of each imaging sub-region measured by the wavefront sensor being $W_{i,j}(\xi, \eta)$, $1 \leq i \leq M$, $1 \leq j \leq N$, calculating the point spread function (PSF) of each imaging sub-region to be $h_{i,j}(x, y)$, $1 \leq i \leq M$, $1 \leq j \leq N$, wherein, $$h_{i,j}(x, y) = \left\| \int\int P_{i,j}(\xi, \eta) \exp(jkW_{i,j}(\xi, \eta)) \exp\left(-j\frac{k}{f}[(x\xi + y\eta)]\right) d\xi d\eta \right\|_2^2;$$

where $P_{i,j}$ (ξ, η) is a pupil function of a sub-lens of the wavefront sensor, f is a focal length of the sub-lens, and k is a wavenumber constant;

T2-2: taking the PSF of each imaging sub-region as an initial PSF value and a constraint condition of the imaging image of each imaging sub-region, and then performing deconvolution processing of the imaging image of each imaging sub-region respectively by the following incremental Wiener filtering iterative formulas to realize a supplementary correction of a residual aberration of the imaging image of each imaging sub-region, $$X_{i,j}^{new}(u, v) = X_{i,j}^{old}(u, v) + \frac{H_{i,j}^*(u, v)S(u, v)}{|H_{i,j}(u, v)|^2 + \gamma_x};$$

$$H_{i,j}^{new}(u, v) = H_{i,j}^{old}(u, v) + \frac{H_{i,j}^*(u, v)S(u, v)}{|X_{i,j}(u, v)|^2 + \gamma_h};$$

$$S(u, v) = Y(u, , v) - X_{i,j}(u, v)H_{i,j}(u, v);$$

wherein, * represents the complex conjugate operator, i and j represent the sequence number of each sub-region, $Y_{i,j}$ (u, v) is the Fourier transform of the imaging image of the imaging sub-region, $X_{i,j}^{new}$ (u, v) and $X_{i,j}^{old}$ (u, v) respectively represent the Fourier transforms of the current and last deconvolution processing iterations of the imaging image of the imaging sub-region, $H_{i,j}^{new}$ (u, v) and $H_{i,j}^{old}$ (u, v) respectively represent the Fourier transforms of the current and last deconvolution processing iterations of the PSF estimation of the imaging sub-region, S(u, v) is the precision term, and with the update of the $X_{i,j}^{new}$ (u, v) and $H_{i,j}^{new}$ (u, v) values, the value of S(u, v) is updated in time; $\gamma_x$ and $\gamma_h$ are parameters that control the iteration step size, and larger values of $\gamma_x$ and $\gamma_h$ correspond to a smaller iteration step size and a slower convergence speed of algorithm and a more accurate solution, and if the values of $\gamma_x$ and $\gamma_h$ decrease, the iteration step size increases and the algorithm will converge to an unsmooth solution faster, wherein, the values of $\gamma_x$ and $\gamma_h$ are $r_h$=0.2|H (0, 0)|$^2$, $r_x$=0.2|X (0, 0)|$^2$.

step T3: after the deconvolution correction of the anisoplanatic region aberration of all image correction areas is completed, performing image stitching to obtain an imaging image with the anisoplanatic aberration of the whole field of view completely corrected.

Wherein, the step T2 is performed by online processing or offline processing (post-processing after imaging).

Embodiment 2

An anisoplanatic aberration correction apparatus for adaptive optical linear beam scanning imaging is provided, which uses the method of Embodiment 1 to perform anisoplanatic aberration correction. In a more specific embodiment, the apparatus comprises an adaptive optical linear beam scanning imaging device, a wavefront sensor, a wavefront controller, a wavefront corrector and a computer;

the wavefront controller is configured to extract a wavefront aberration measured by the wavefront sensor and feeds it back to control the wavefront corrector, the computer is configured to control the wavefront controller according to the method of Embodiment 1 to complete a closed-loop temporal correction on an anisoplanatic region aberration and realize online or offline regional correction on an anisoplanatic region aberration.

Figure 2:
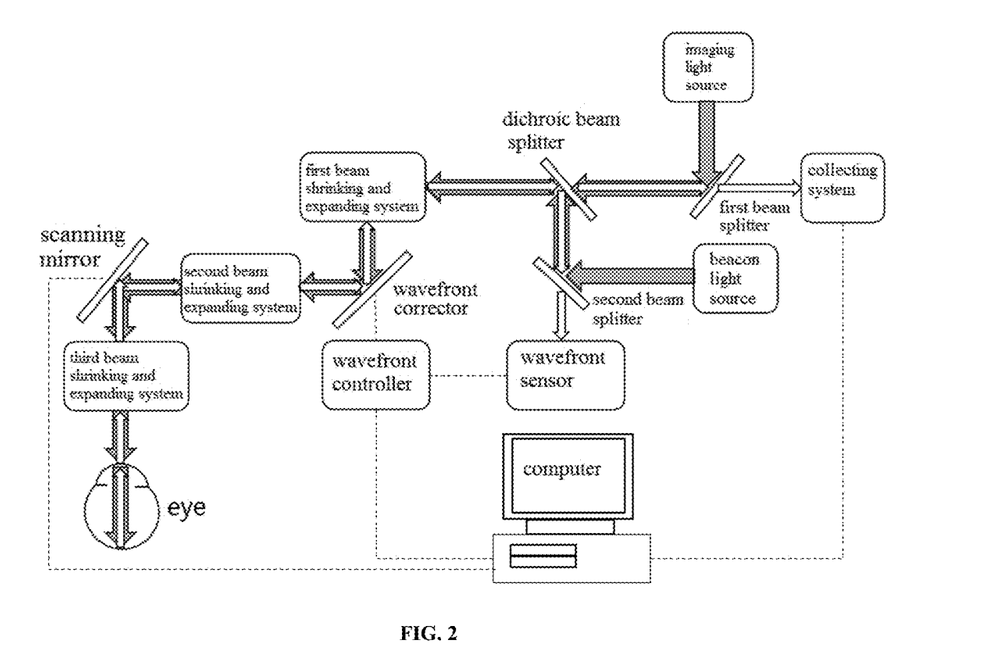
FIG. 2 is a schematic diagram of the principle of an anisoplanatic aberration correction apparatus for adaptive optical linear beam scanning imaging in Embodiment 2 of the present application.

Referring to FIG. 2, in a preferred embodiment, the adaptive optical linear beam scanning imaging device comprises an imaging light source, a collecting system, a first beam splitter, a dichroic beam splitter, a second beam splitter, a first beam shrinking and expanding system, a second beam shrinking and expanding system, a third beam shrinking and expanding system, a scanning mirror and a beacon light source;

a linear beam emitted by the imaging light source is reflected by the first beam splitter, transmitted through the dichroic beam splitter, and propagated by the first beam shrinking and expanding system to reach the wavefront corrector, the wavefront corrector reflects the linear beam to the second beam shrinking and expanding system which then propagates the linear beam to the scanning mirror, the scanning mirror reflects the linear beam to the third beam shrinking and expanding system which then propagates the linear beam into an eye to illuminate a fundus retina, and after being reflected by the fundus retina, the reflected linear beam exits the eye and returns to the first beam splitter along the original path thereof, and enters the collecting system after being transmitted through the first beam splitter, the collecting system is configured to photo-electrically convert the linear beam, the computer is configured to control the scanning mirror to realize linear beam scanning, and synchronously control the collecting system to obtain a retinal imaging image;

a parallel beam emitted by the beacon light source is reflected by the second beam splitter, and after being reflected by the dichroic beam splitter, the parallel beam is propagated by the first beam shrinking and expanding system to reach the wavefront corrector, the wavefront corrector reflects the parallel beam to the second beam shrinking and expanding system which then propagates the parallel beam to the scanning mirror, the scanning mirror reflects the parallel beam to the third beam shrinking and expanding system which then propagates the parallel beam into the eye to illuminate the fundus retina, and after being reflected by the fundus retina, the reflected parallel beam exits the eye and returns to the second beam splitter along the original path thereof, and enters the wavefront sensor after being transmitted through the second beam splitter, and the wavefront sensor is configured to measure the wavefront aberration.

Wherein, the beam shrinking and expanding system can adopt a reflective structure, a transmissive structure, or a catadioptric structure, and the beam shrinking and expanding ratio is determined according to the apertures of the two associated pupils.

The wavefront controller is configured to extract a wavefront aberration measured by the wavefront sensor and feeds it back to control the wavefront corrector, the computer synchronizes the scanning time of the scanning mirror and controls the wavefront controller to complete the temporal closed-loop correction of aberration. Then the computer performs online or offline regional correction on an anisoplanatic region aberration, and finally obtains the imaging image with the anisoplanatic aberration of the entire field of view completely corrected.

Figure 3:
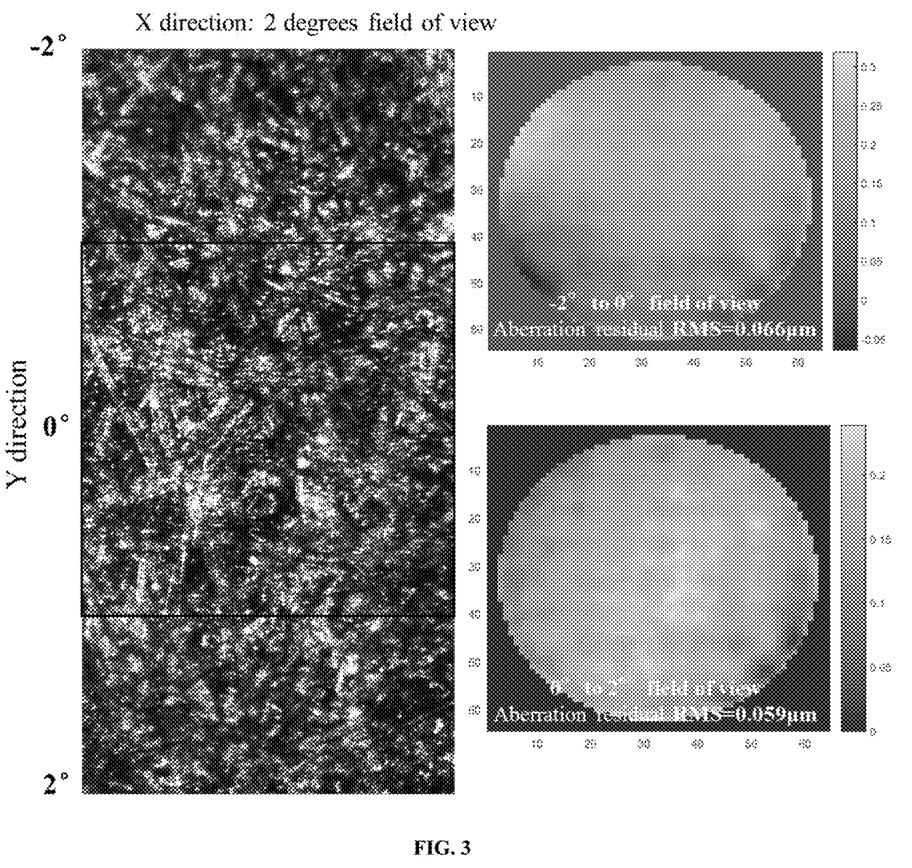
FIG. 3 is a result of adopting conventional single correction of adaptive optical aberration in Embodiment 3.

Embodiment 3 Comparing the Conventional Correction Method with the Method of the Present Application Referring to FIG. 3, it is a result of conventional single correction of adaptive optical aberration. Wherein, the imaging field of view is 2 degrees (scanning direction)*4 degrees (linear beam direction), after a single correction of aberration is performed on the whole imaging field of view, only the central area of 2*2 degrees belongs to the isoplanatic region, the aberration of this area in the field of view is completely corrected, but the aberration of the two side areas in the field of view is not completely corrected, these two side areas are relatively blurred; the wavefront aberration data of the corresponding two sub-regions (measured by the Hartmann wavefront sensor) can also be seen, and the aberration residual exceeds the required diffraction limit ($\lambda/14$, $\lambda=795$ nm).

Figure 4:
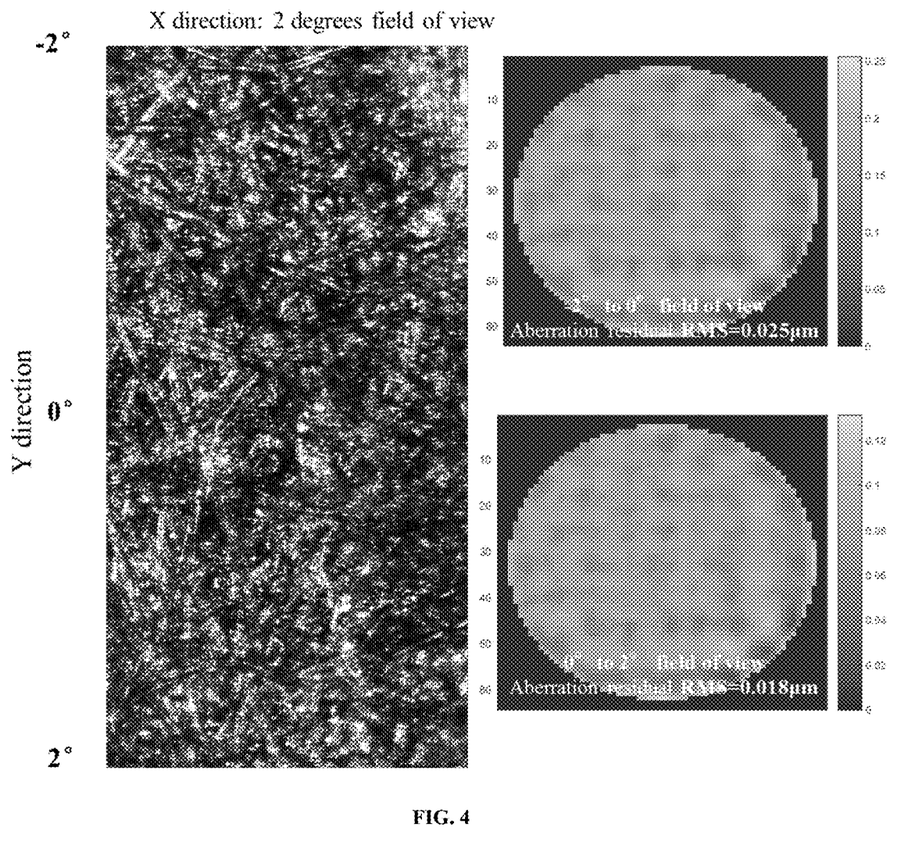
FIG. 4 is a result obtained by adopting the method of the present application in Embodiment 3.

FIG. 4 is a result obtained by adopting the method of the present application. Wherein, the image deconvolution processing performed on the two sub-region images of the edge field of view on both sides can effectively correct the residual aberration, and the corrected aberration residual can meet the required diffraction limit.

In FIGS. 3 and 4, the X direction is the scanning direction, and the Y direction is the linear beam direction.

Although the embodiments of the present application have been disclosed as above, they are not limited to the application ways listed in the description and the implementations, and can be applied to various fields suitable for the present application. And additional modifications will readily occur to those skilled in the art, therefore the application is not limited to the specific details without departing from the general concept defined by the claims and the scope of equivalents thereof.

The invention claimed is:

1. An anisoplanatic aberration correction method for adaptive optical linear beam scanning imaging, characterized in comprising: in an adaptive optical linear beam scanning imaging system, performing temporal correction on an anisoplanatic region aberration in a linear beam scanning direction, and performing regional correction on an anisoplanatic region aberration in a linear beam direction,
  wherein the process of performing temporal correction on an anisoplanatic region aberration in a linear beam scanning direction comprises the following steps:
  step S1: according to scanning time, dividing an anisoplanatic imaging region into multiple imaging sub-regions in the scanning direction, the imaging sub-regions comprise imaging sub-region 1, imaging sub-region 2, . . . , and imaging sub-region N, a field of view of each imaging sub-region in the scanning direction is no more than 2°;
  step S2: measuring the aberration of each imaging sub-region by a wavefront sensor successively, and feeding back to control a wavefront corrector successively to complete a closed-loop correction of the aberration of each imaging sub-region successively;
    wherein, in each imaging sub-region, a central area within ±1° in the linear beam direction meets an isoplanatic region principle both in the scanning direction and in the linear beam direction, and the aberration in the central area is completely corrected.

2. The anisoplanatic aberration correction method for adaptive optical linear beam scanning imaging according to claim 1, wherein the multiple imaging sub-regions can be uniformly divided or non-uniformly divided; N is a positive integer.

3. The anisoplanatic aberration correction method for adaptive optical linear beam scanning imaging according to claim 2, wherein the field of view of each imaging sub-region in the scanning direction is 2°.

4. The anisoplanatic aberration correction method for adaptive optical linear beam scanning imaging according to claim 1, wherein the process of performing regional correction on an anisoplanatic region aberration in a linear beam direction comprises the following steps:
  step T1: dividing the part of each imaging sub-region on both sides of the central area in the linear beam direction into two image correction areas: a first image correction area and a second image correction area; the first image correction area has an area range of $-1°$ to $-M°$ in the linear beam direction, and the second image correction area has an area range of $1°$ to $M°$ in the linear beam direction;
  step T2: converting a wavefront aberration of each imaging sub-region measured by the wavefront sensor to obtain a point spread function (PSF) of each imaging sub-region, taking the PSF of each imaging sub-region as an initial PSF value and a constraint condition of the two image correction areas corresponding to each imaging sub-region, and then performing deconvolution correction of the anisoplanatic region aberration of the two image correction areas respectively by Wiener filtering;
  step T3: after the deconvolution correction of the anisoplanatic region aberration of all image correction areas is completed, performing image stitching to obtain an imaging image with the anisoplanatic aberration of the whole field of view completely corrected.

5. The anisoplanatic aberration correction method for adaptive optical linear beam scanning imaging according to claim 4, wherein M is a positive integer, and M does not exceed 3.

6. The anisoplanatic aberration correction method for adaptive optical linear beam scanning imaging according to claim 4, wherein the step T2 is specifically as follows:
  T2-1: with the wavefront aberration of each imaging sub-region measured by the wavefront sensor being $W_{i,j}(\xi,\eta)$, $1 \leq i \leq M$, $1 \leq j \leq N$, calculating the point spread function (PSF) of each imaging sub-region to be $h_{i,j}(x, y)$, $1 \leq i \leq M$, $1 \leq j \leq N$, wherein, $$h_{i,j}(x, y) = \left\| \int\int P_{i,j}(\xi, \eta) \exp(jkW_{i,j}(\xi, \eta)) \exp\left(-j\frac{k}{f}[(x\xi + y\eta)]\right) d\xi d\eta \right\|_2^2;$$

where $P_{i,j}(\xi,\eta)$ is a pupil function of a sub-lens of the wavefront sensor, f is a focal length of the sub-lens, and k is a wavenumber constant;
  T2-2: taking the PSF of each imaging sub-region as an initial PSF value and a constraint condition of the imaging image of each imaging sub-region, and then performing deconvolution processing of the imaging image of each imaging sub-region respectively by the following incremental Wiener filtering iterative formulas to realize a supplementary correction of a residual aberration of the imaging image of each imaging sub-region, $$\overline{X}_{i,j}^{new}(u,v) = \overline{X}_{i,j}^{old}(u,v) + \frac{\overline{H}_{i,j}^{*}(u,v)S(u,v)}{\left|\overline{H}_{i,j}(u,v)\right|^2 + \gamma_x};$$

$$\overline{H}_{i,j}^{new}(u,v) = \overline{H}_{i,j}^{old}(u,v) + \frac{\overline{X}_{i,j}^{*}(u,v)S(u,v)}{\left|\overline{X}_{i,j}(u,v)\right|^2 + \gamma_h};$$

$$S(u,v) = Y(u,,v) - \overline{X}_{i,j}(u,v)\overline{H}_{i,j}(u,v);$$

wherein, * represents the complex conjugate operator, i and j represent the sequence number of each sub-region, $Y_{i,j}(u, v)$ is the Fourier transform of the imaging image of the imaging sub-region, $\overline{X}_{i,j}(u, v)$ and $\overline{X}_{i,j}(u, v)$ respectively represent the Fourier transforms of the current and last deconvolution processing iterations of the imaging image of the imaging sub-region, $\overline{H}_{i,j}(u, v)$ and $\overline{H}_{i,j}(u, v)$ respectively represent the Fourier transforms of the current and last deconvolution processing iterations of the PSF estimation of the imaging sub-region, $S(u,v)$ is the precision term, and with the update of the $\overline{X}_{i,j}(u, v)$ and $\overline{H}_{i,j}(u, v)$ values, the value of $S(u,v)$ is updated in time; $\gamma_x$ and $\gamma_h$ are parameters that control the iteration step size, and larger values of $\gamma_x$ and $\gamma_h$ correspond to a smaller iteration step size and a slower convergence speed of algorithm and a more accurate solution, and if the values of $\gamma_x$ and $\gamma_h$ decrease, the iteration step size increases and the algorithm will converge to an unsmooth solution faster, wherein, the values of $\gamma_x$ and $\gamma_h$ are $r_h=0.2|\overline{H}(0,0)|^2$, $r_x=0.2|\overline{X}(0,0)|^2$.

7. The anisoplanatic aberration correction method for adaptive optical linear beam scanning imaging according to claim 6, wherein the step T2 is performed by online processing or offline processing.

8. An anisoplanatic aberration correction apparatus for adaptive optical linear beam scanning imaging, comprising: an adaptive optical linear beam scanning imaging device, a wavefront sensor, a wavefront controller, a wavefront corrector and a computer;
wherein the wavefront controller is configured to extract a wavefront aberration measured by the wavefront sensor and feeds it back to control the wavefront corrector, the computer is configured to control the wavefront controller according to the method of claim 1 to complete a closed-loop temporal correction on an anisoplanatic region aberration and realize online or offline regional correction on an anisoplanatic region aberration.

9. The anisoplanatic aberration correction apparatus for adaptive optical linear beam scanning imaging according to claim 8, wherein the adaptive optical linear beam scanning imaging device comprises an imaging light source, a collecting system, a first beam splitter, a dichroic beam splitter, a second beam splitter, a first beam shrinking and expanding system, a second beam shrinking and expanding system, a third beam shrinking and expanding system, a scanning mirror and a beacon light source;
a linear beam emitted by the imaging light source is reflected by the first beam splitter, transmitted through the dichroic beam splitter, and propagated by the first beam shrinking and expanding system to reach the wavefront corrector, the wavefront corrector reflects the linear beam to the second beam shrinking and expanding system which then propagates the linear beam to the scanning mirror, the scanning mirror reflects the linear beam to the third beam shrinking and expanding system which then propagates the linear beam into an eye to illuminate a fundus retina, and after being reflected by the fundus retina, the reflected linear beam exits the eye and returns to the first beam splitter along the original path thereof, and enters the collecting system after being transmitted through the first beam splitter, the collecting system is configured to photo-electrically convert the linear beam, the computer is configured to control the scanning mirror to realize linear beam scanning, and synchronously control the collecting system to obtain a retinal imaging image;
a parallel beam emitted by the beacon light source is reflected by the second beam splitter, and after being reflected by the dichroic beam splitter, the parallel beam is propagated by the first beam shrinking and expanding system to reach the wavefront corrector, the wavefront corrector reflects the parallel beam to the second beam shrinking and expanding system which then propagates the parallel beam to the scanning mirror, the scanning mirror reflects the parallel beam to the third beam shrinking and expanding system which then propagates the parallel beam into the eye to illuminate the fundus retina, and after being reflected by the fundus retina, the reflected parallel beam exits the eye and returns to the second beam splitter along the original path thereof, and enters the wavefront sensor after being transmitted through the second beam splitter, and the wavefront sensor is configured to measure the wavefront aberration.

* * * * *